United States Patent
Elbert et al.

(10) Patent No.: US 12,010,394 B2
(45) Date of Patent: Jun. 11, 2024

(54) SECURE CONTENT DISTRIBUTION AND TRUSTED RECORDING OF CONTENT CONSUMPTION

(71) Applicant: Synamedia Limited, Staines Upon Thames (GB)

(72) Inventors: Dan Ariel Elbert, Jerusalem (IL); Vadim Kharitonsky, Kfar Adumim (IL); Anatoly Seldin, Jerusalem (IL); Zorach Reuven Wachtfogel, Elazar (IL); Ian John Bastable, Hampshire (GB); Gareth John Bowen, Chandler's Ford (GB); Peter Gibbs, Winchester (GB); Moshe Elad, Gedera (IL); Max Sorkin, Gedera (IL)

(73) Assignee: Synamedia Limited, Staines Upon Thames (GB)

( * ) Notice: Subject to any disclaimer, the term of this patent is extended or adjusted under 35 U.S.C. 154(b) by 191 days.

(21) Appl. No.: 17/523,587

(22) Filed: Nov. 10, 2021

(65) Prior Publication Data
US 2023/0142278 A1    May 11, 2023

(51) Int. Cl.
*H04N 21/633* (2011.01)
*H04N 21/235* (2011.01)
*H04N 21/266* (2011.01)
*H04N 21/6334* (2011.01)

(52) U.S. Cl.
CPC ... *H04N 21/63345* (2013.01); *H04N 21/2351* (2013.01); *H04N 21/266* (2013.01)

(58) Field of Classification Search
None
See application file for complete search history.

(56) References Cited

U.S. PATENT DOCUMENTS

| | | |
|---|---|---|
| 8,793,492 B2 | 7/2014 | Shah et al. |
| 2005/0278259 A1 | 12/2005 | Gunaseelan et al. |
| 2008/0098212 A1* | 4/2008 | Helms ............. G06F 21/6209 713/155 |

(Continued)

OTHER PUBLICATIONS

Extended European Search Report for corresponding EP Appl. No. 22204958.7 dated Apr. 6, 2023.

(Continued)

*Primary Examiner* — Omar S Parra
(74) *Attorney, Agent, or Firm* — Fernando & Partners, LLP

(57) ABSTRACT

Techniques for a trusted system for secure content distribution and trusted recording of content consumption are described. In some embodiments, the trusted system transcodes and transcrypts a media content item using a key obtained from a content provider and one or more keys based on an entitlement from a service provider to generate an encrypted media content item. The trusted system further receives a request to provide the media content item to a client device. The trusted system also obtains a signed audit token recording the request upon an authorization by the service provider based on the entitlement and a confirmation by the content provider, where the signed audit token is signed by the content provider and the service provider. The trusted system additionally provides the one or more keys for decrypting the encrypted media content item and reports the signed audit token.

20 Claims, 12 Drawing Sheets

(56) References Cited

U.S. PATENT DOCUMENTS

| | | | |
|---|---|---|---|
| 2013/0125223 A1* | 5/2013 | Sorotokin | H04L 9/3213 |
| | | | 713/168 |
| 2014/0006214 A1 | 1/2014 | Paleja et al. | |
| 2015/0271541 A1 | 9/2015 | Gonder et al. | |
| 2017/0221029 A1 | 8/2017 | Lund et al. | |

OTHER PUBLICATIONS

ETSI, "Digital Video Broadcasting (DVB); IP Datacast over DVB-H: Serivce Purchase and Protection", ETSI TS 102 474 V1.3.X, copyright 2007, 298 pages.

* cited by examiner

700

┌─ 750
| Obtaining the signed audit token includes: obtaining an audit token from the
| service provider, where the audit token is generated and signed by the service
| provider upon the authorization by the service provider based on the
| entitlement; and requesting, from the content provider, the confirmation of the
| audit token based on conditions defined by the content provider and the
| service provider; and receiving from the content provider the signed audit
| token
|
| ┌─ 752
| | Receive from the content provider an indication of not granting the
| | confirmation based on the conditions; and forgo providing the one or
| | more keys for decrypting the encrypted media content item and forgoing
| | reporting the signed audit token

┌─ 760
| Obtain the media content item from the content provider, where the media
| content item is encrypted by the content provider; and receive, from the
| content provider, the key associated with the media content item for
| decrypting the media content item
|
| ┌─ 762
| | Transcoding and transcrypting the media content item using the key
| | obtained from the content provider and the one or more keys from the
| | service provider to generate the encrypted media content item includes:
| | obtaining the one or more keys associated with the entitlement of the
| | media content item for the client device; decrypting the media content
| | item using the key; and re-encrypting the media content item using the
| | one or more keys to generate the encrypted media content item

┌─ 770
| The media content item obtained from the content provider is encoded
| according to a first quality based on conditions defined by the content provider
| and the service provider, and the method further includes transcoding the
| media content item from the first quality to at least one second quality for
| distribution by the service provider according to the conditions

Figure 7B

SECURE CONTENT DISTRIBUTION AND TRUSTED RECORDING OF CONTENT CONSUMPTION

TECHNICAL FIELD

The present disclosure relates generally to multimedia content distribution, and, more specifically, to recording and validating the distribution of multimedia content.

BACKGROUND

Content providers derive revenue from providing valuable multimedia content to service providers for distribution. The service providers then package the multimedia content for purchases by subscribers of the service providers. Often, the payments from the service providers to the content providers are based on the number of purchases by the subscribers. However, discrepancies may occur when the actual number of consumption differs from the reported number of consumption. Currently, the content providers do not have a reliable way to validate the content viewing reports from the service providers. Consequently, the content providers and/or the service providers may lose revenue due to inaccurate content consumption reporting.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 7A-7C are flowcharts illustrating a method for secure content distribution and trusted recording of content consumption in accordance with some embodiments.

Figure 1:
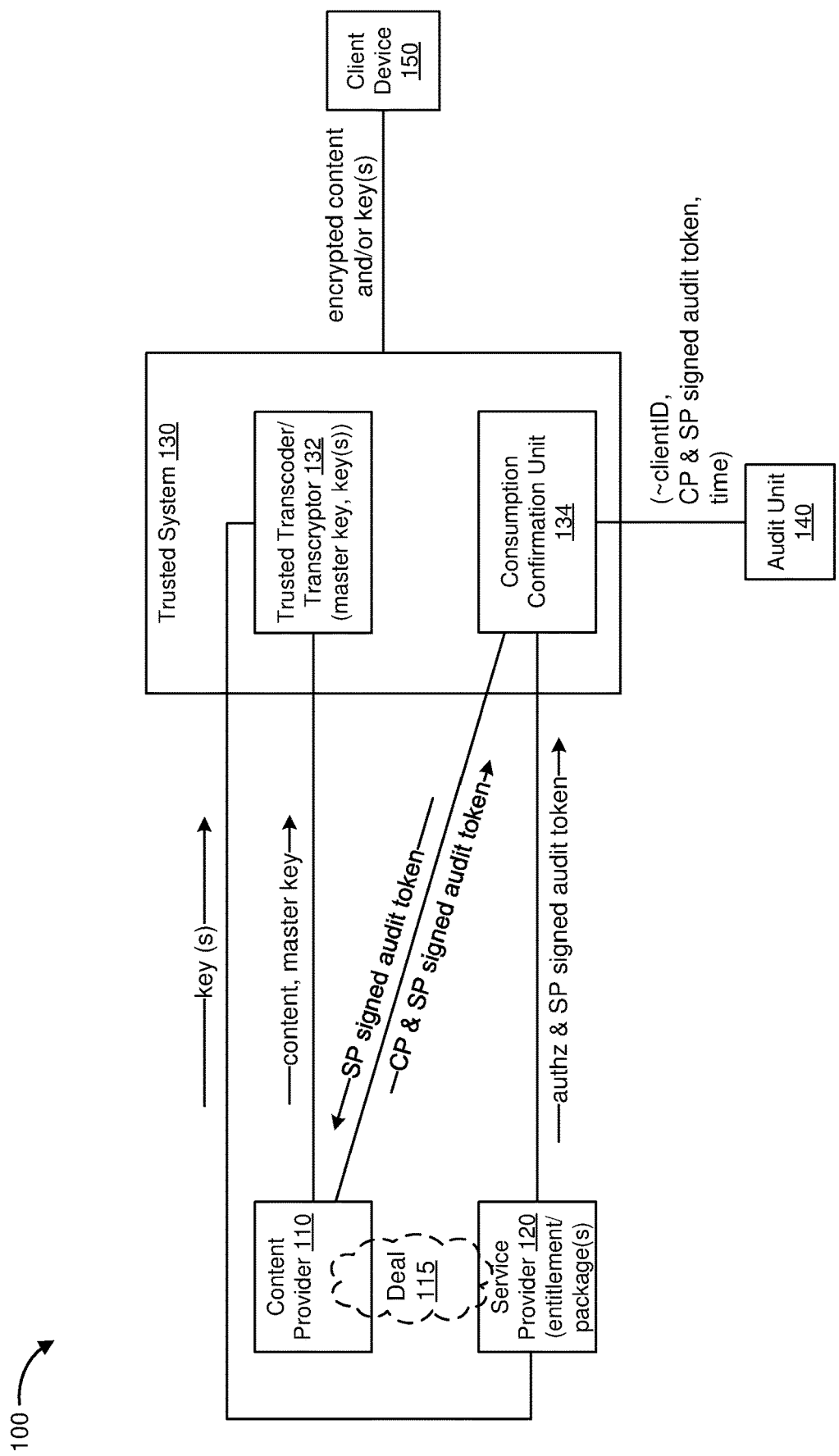
FIG. 1 is a block diagram of an exemplary trusted environment for secure content distribution and trusted recording of content consumption in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Methods, devices, and systems are described herein for secure distribution of media content and trusted recordation of media content consumption. The methods, devices, and systems in accordance with some embodiments provide accurate auditing of content purchasing, distribution, and consumption information for secure media content distribution. The aforementioned problems of inaccurate auditing exist in both over-the-top (OTT) digital rights management (DRM) protected content distribution systems and broadcast conditional access (CA) protected content distribution systems. The trusted systems described herein solve the auditing problems in both DRM and CA systems by generating audit tokens upon content purchasing and/or consumption. Once generated, the audit token is signed by both the content provider and the service provider for verification. Once verified, the audit token can be used for trusted reporting of content purchasing, distribution, and/or consumption. In some embodiments, an audit unit for auditing purposes receives the audit token along with the time of consumption and an obfuscated client identity, e.g., obfuscated for privacy consideration but verifiable for auditing purposes. As such, the trusted systems described herein enable both the content provider and the service provider to audit the number of content consumption and agree on the number.

In accordance with various embodiments, a method is performed at a server that includes one or more processors and a non-transitory memory. The method includes transcoding and transcrypting a media content item using a key obtained from a content provider and one or more keys based on an entitlement from a service provider to generate an encrypted media content item. The method further includes receiving a request to provide the media content item to a client device. The method also includes obtaining a signed audit token recording the request upon an authorization by the service provider based on the entitlement and a confirmation by the content provider, where the signed audit token is signed by the content provider and the service provider. The method additionally includes providing the one or more keys for decrypting the encrypted media content item and reporting the signed audit token.

Example Embodiments

Trusted methods, devices, and systems utilize audit tokens to address the aforementioned multimedia content distribution and consumption auditing issues. Utilizing the audit tokens, the trusted systems in accordance with some embodiments transcode and transcrypt multimedia content from a content provider for secure distribution by a service provider. The trusted systems also manage multimedia content access during the distribution process, including cryptographically protecting both the content access and the reporting of the multimedia content consumption by subscribers. In some embodiments, the trusted systems allow the service provider to manage its own multimedia content offerings to the subscribers in addition to a deal between the content provider and the service provider and map such additional offerings to packages subject to the terms of the deal. As such, the content provider has control over both content distribution and consumption reporting without limiting the service provider's ability to manage its own content offerings.

Referring to FIG. 1, FIG. 1 is a block diagram illustrating an exemplary trusted environment 100 for secure content distribution and recording of content consumption in accordance with some embodiments. In some embodiments, the trusted environment includes a trusted system 130 and an audit unit 140. In some embodiments, the trusted system 130 includes a transcoder and transcryptor unit 132 and a consumption confirmation unit 134. The transcoder and transcryptor unit 132 obtains multimedia content and a master key from a content provider (CP) 110 in some embodiments. In some embodiments, the transcoder and transcryptor unit 132 also obtains key(s) from a service provider (SP) 120. Using the master key from the content provider 110 and the key(s) from the service provider 120, the transcoder and transcryptor unit 132 performs operations, such as decoding, encoding, re-encoding, decryption, encryption, and/or re-encryption of the multimedia content in preparation for content distribution, e.g., distributing encrypted content and/or key(s) to a client device 150 (also referred to hereinafter as "a client").

As used herein, multimedia content (also referred to hereinafter as "media content", "media content item(s)", "media asset", or "content") can include any multimedia data, such as visual data, audio data, and/or text, etc. The encoding and/or encryption of the multimedia content in the trusted system 130 are not limited to any particular encoding method or protocol and/or cryptographic method or standard. Moreover, the multimedia content can be playback content (e.g., video-on-demand (VOD) content) or live content.

Typically, the content provider 110 provides the multimedia content and the service provider 120 distributes the multimedia content according to a deal 115 between the content provider 110 and the service provider 120. The deal 115 defines conditions for the content distribution, including, but are not limited to, the payment from the service provider 120 to the content provider 110 according to the number of end subscribers that receive access to the multimedia content. As will be described below in further detail, in some embodiments, the deal 115 also includes the mappings between the content and reference(s) to the content as well as metadata of the content, e.g., attributes of the associated content.

In some embodiments, the service provider 120 offers its subscribers various packages of content. Some of the packages are structured according to the deal 115, while some other packages extend the deal 115 in accordance with some embodiments. The service provider 120 keeps track of the packages and the entitlements of the subscribers to the content in various packages. When the content is requested, the service provider 120 authorizes the request and generates an audit token representing the purchasing, distribution, and/or consumption of the content in accordance with some embodiments. Further, in some embodiments, the service provider 120 signs the audit token and sends to the trusted system 130 for confirmation. The consumption confirmation unit 134, upon receiving the service provider signed audit token, forwards the audit token to the content provider 110 for confirmation in accordance with some embodiments. The content provider 110 then verifies the audit token according to the deal 115 and signs the audit token. In some embodiments, the consumption confirmation unit 134 obtains the audit token that has been signed by both the content provider 110 and the service provider 120 and reports the audit token along with obfuscated client identifier and a timestamp to the audit unit 140.

In the trusted environment 100, the audit token, which represents the authorization of access to the content by the client device 150, is securely signed by both the service provider 120 and the content provider 110. As such, the evidence of the content purchasing, distribution, and/or consumption is securely preserved and agreed upon by both the content provider 110 and the service provider 120, thus offering accurate auditing of content distribution and preventing fraud by any of these two parties.

It should be noted that the exemplary trusted environment 100 is by way of example and can include different and/or additional components. Further, the trusted system 130 and the audit unit 140 can be combined or separated, executed by one or more processors, and/or co-located on one server or distributed over multiple servers. Likewise, components in the trusted systems 130, such as the transcoder and transcryptor unit 120 and the consumption confirmation unit 134, can be combined or separated, executed by one or more processors, and/or co-located on one computing device or distributed over multiple computing devices.

Figure 2:
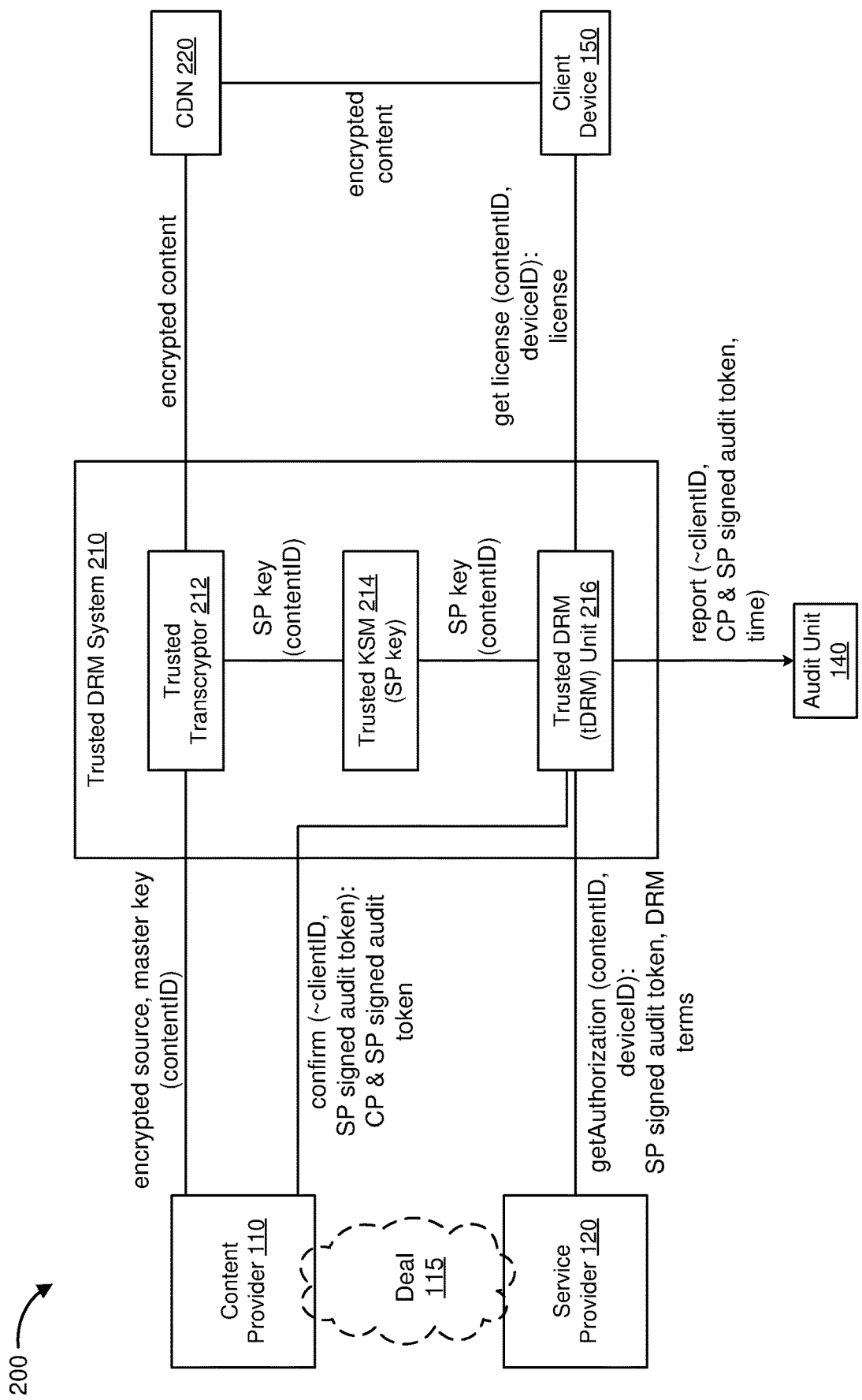
FIG. 2 is a block diagram of an exemplary trusted environment with digital rights management (DRM) in accordance with some embodiments.
Figure 4:
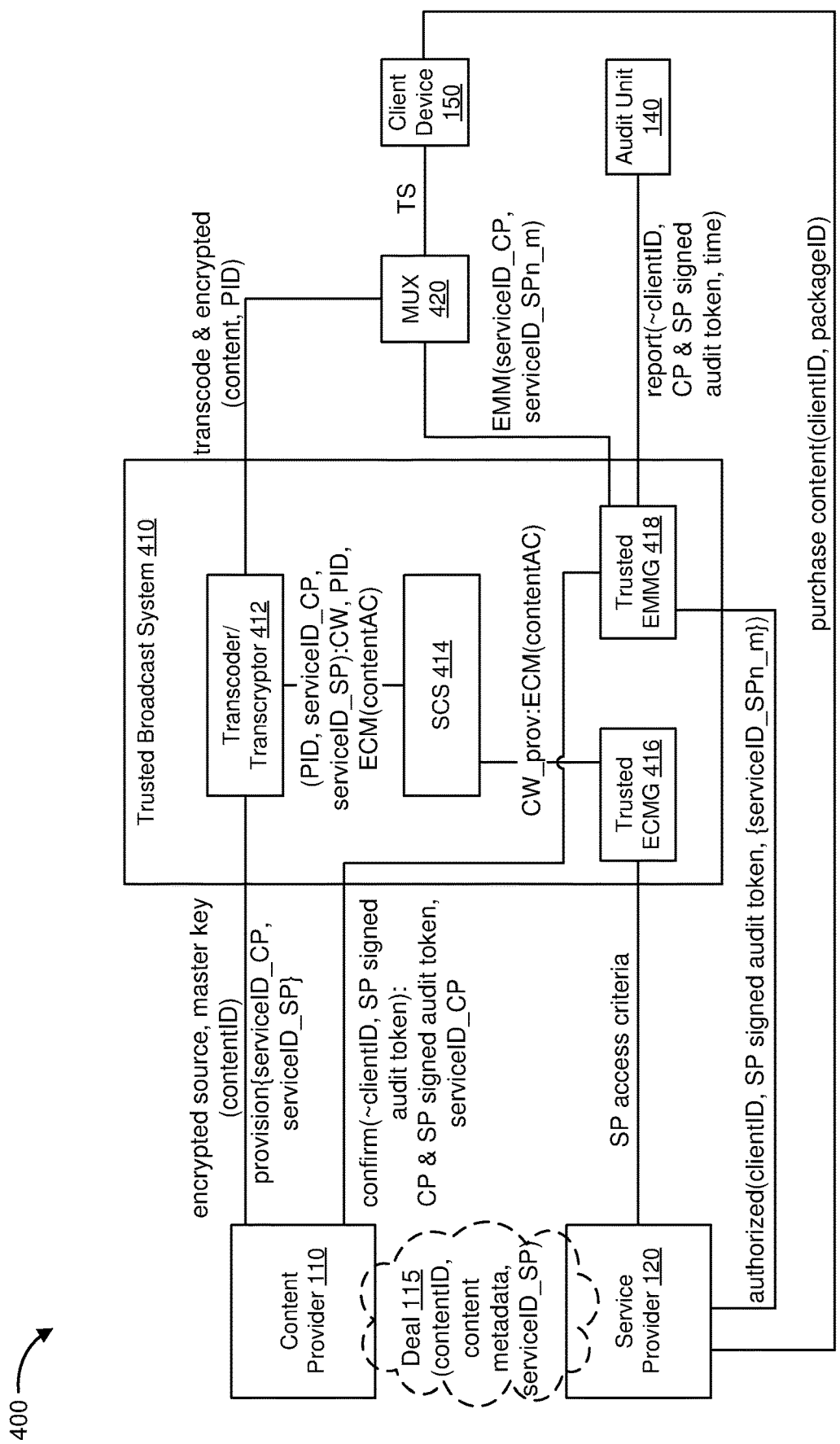
FIG. 4 is a block diagram of an exemplary trusted environment with conditional access (CA) in accordance with some embodiments.

It should also be noted that various features described herein with reference to FIG. 1 may be embodied in a wide variety of forms, and that any specific structures and/or functions described herein are merely illustrative. For example, when the media content is playback content, a trusted digital rights management (DRM) system as shown in FIG. 2 can be an embodiment of the trusted system 130. In another example, when the media content is live content, a trusted broadcast system as shown in FIG. 4 can be an embodiment of the trusted system 130. Those of ordinary skill in the art will appreciate that various embodiments other than DRM and CA systems can be used in place of or in conjunction with the trusted system 130 described herein.

FIG. 2 is a block diagram illustrating an exemplary trusted environment 200 with DRM for content protection in accordance with some embodiments. In some embodiments, the trusted environment 200 includes a trusted DRM system 210 (e.g., one embodiment of the trusted system 130 in FIG. 1) that interacts with the content provider 110, the service provider 120, the audit unit 140, and the client device 150. The trusted DRM system 210 utilizes DRM licenses for secure content distribution and reporting of the content consumption. In some embodiments, the trusted DRM system 210 includes a trusted transcryptor 212 and a trusted key security module (KSM) (tKSM) 214 coupled with each other, where the combination of the trusted transcryptor 212 and the trusted KSM 214 forms one embodiment of the trusted transcoder and transcryptor unit 132 in FIG. 1. In some embodiments, the trusted DRM system 210 also includes a trusted DRM (tDRM) unit 216 coupled with the tKSM 214, where the tDRM unit 216 corresponds to one embodiment of the consumption confirmation unit 134 in FIG. 1.

In some embodiments, the trusted transcryptor 212 obtains a media content item from the content provider 110, e.g., by requesting the media content item associated with a content identifier (ID). In some embodiments, in response to the request, the content provider 110 sends to the trusted transcryptor 212 the media content item that is encoded by the content provider 110 according to a first quality based on the deal 115 between the content provider 110 and the service provider 120, e.g., the master content with the highest quality defined in the deal 115. Upon receiving the media content item, the trusted transcryptor 212 transcodes the media content item from the first quality to a second quality for distribution by the service provider according to the deal 115 in accordance with some embodiments.

In some embodiments, to transcode and/or transcrypt the media content item for distribution, the trusted transcryptor 212 uses a key (e.g., a content provider master key) obtained from the content provider 110 to decrypt the media content item. Further, in some embodiments, the trusted transcryptor 212 uses service provider key(s) obtained from the service provider 120, e.g., a tKSM key, to encrypt and/or re-encrypt the media content item. As such, the trusted transcryptor 212 generates an encrypted media content item and sends it to a content delivery network 220 for distribution to the client device 150.

When the client device 150 requests a DRM license for consuming the media content item, the request indicates consumption of the media content item by the client device 150. To securely deliver the DRM license, the tDRM unit 216 obtains authorization of the request, e.g., by sending a request including the content identifier and the client device identifier to the service provider 120. Further, upon receiving the authorization, the tDRM unit 216 retrieves the service provider key (e.g., the tKSM key) associated with the content identifier from the tKSm 214, packages the service provider key into the DRM license, and provides the DRM license to the client device 150. Additionally, to record the content consumption, the tDRM unit 216 obtains an audit token from the service provider 120, where the audit token is generated by the service provider 120 for audit report upon the successful authorization of the request and signed by the service provider 120.

In some embodiments, the audit token indicates the authorization information and includes information such as the content identifier, the time of the transaction, and/or an obfuscated client identifier. The tDRM unit 216 then sends the service provider signed audit token to the content provider 110 for confirmation and signature before sending the audit token that is signed by both the content provider 110 and the service provider 120 to the audit unit 140 for recording. Using the information in the audit unit 140, an auditor can verify the authenticity of the audit token and produce trusted content consumption reports for both the content provider 110 and the service provider 120.

In some embodiments, the client identifier associated with the client device 150 and/or a subscriber (e.g., a device ID associated with the client device 150, a user ID, a subscriber ID, an account number, etc.) is known by the service provider 120. For privacy consideration and for nonrepudiation validation of the authorization granted by the service provider 120, the tDRM unit 216 provides obfuscated (e.g., hashed) value of the client identifier (denoted as ~clientID in FIG. 2). The obfuscated value cannot be reverted to the real subscriber identity, thus protecting the privacy of the subscriber, but is sufficient for the content provider 110 to confirm the unique consumption of the content by the subscriber.

As shown in FIG. 2, the audit token is generated by the service provider 120 upon successful authorization of content consumption and signed by both the content provider 110 and the service provider 120. As such, the content consumption information is cryptographically protected and cannot be forged by either the content provider 110 or the service provider 120. Further, the content provider 110 confirms the audit token according to the deal 115 and signs the audit token upon successful confirmation. Accordingly, using the information from the audit unit 140, conformance to the terms of the deal 115 can be verified.

Figure 3:
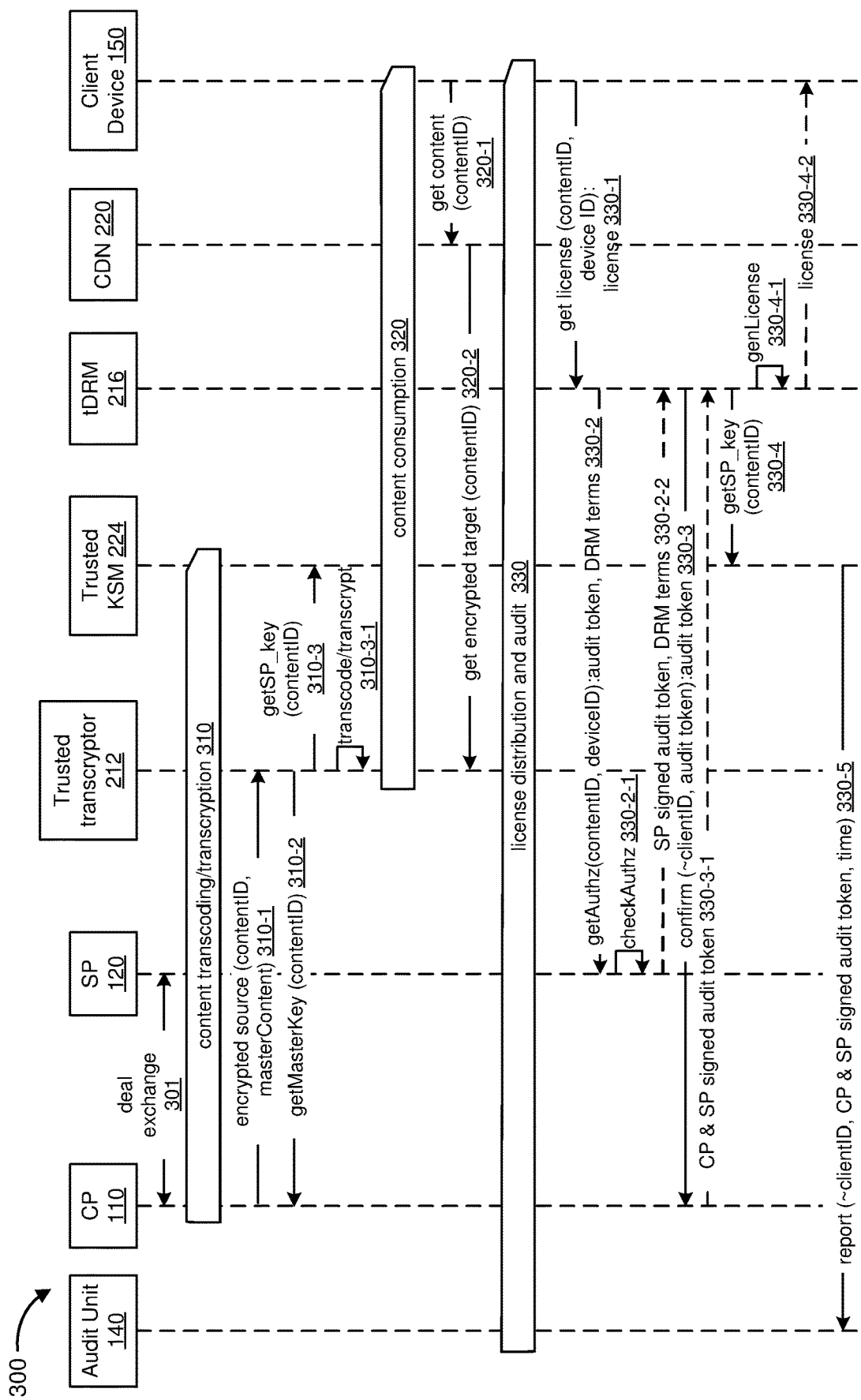
FIG. 3 is a sequence diagram illustrating secure content distribution and audit of content consumption in the exemplary trusted DRM environment in accordance with some embodiments.

FIG. 3 is a sequence diagram 300 illustrating secure content distribution and audit of content consumption by the trusted DRM system 210 (FIG. 2) in accordance with some embodiments. In some embodiments, the sequence starts with a deal exchange between the content provider 110 and the service provider 120 in step 301. The content provider 110 and the service provider 120 exchange the deal (e.g., the deal 115 in FIGS. 1 and 2) to define content distribution conditions and content metadata. In some embodiments, the content metadata specify attributes of the associated content. For example, an electronic program guide (EPG) can use the content metadata to display the content information to facilitate subscription and/or purchases of the content.

In step 310, the trusted transcryptor 212 coordinates with the content provider 110, the service provider 120, and the trusted KSM (tKSM) 224 to perform content transcoding and/or transcryption. In the first sub-step 310-1 within step 310, the content provider the trusted transcryptor 212 with the encrypted master content, e.g., by issuing a putEncryptedSource(contentID, masterContent) command, where contentID is the content identifier and masterContent is the content that has the highest quality defined according to the deal. In sub-step 310-2, to decrypt the encrypted master content, the trusted transcryptor 212 requests from the content provider 110 the master key, e.g., by sending a getMasterKey(contentID) command. In sub-step 310-3, the trusted transcryptor 212 requests from tKSM 224 the service provider key in preparation for content distribution by the service provider 120, e.g., by issuing a getSP_key(contentID) command to obtain the service provider key for content re-encryption. In sub-step 310-3-1, the trusted transcryptor 212 transcodes and/or transcrypts the master content, e.g., by decoding the master content, decrypting the master content using the master key, re-encoding in a quality lower than the master content according to the deal, and/or re-encrypting using the tKSM key for distribution by the service provider 120, etc.

In step 320, the client device 150 requests content consumption through the trusted DRM system. In sub-step 320-1, the client device 150 sends a content request to the CDN 220. In some embodiments, the content request includes the content identifier associated with the requested content. The CDN 220 then forwards the content request to the trusted transcryptor 212 to obtain the encrypted content corresponding to the content identifier and returns the encrypted content, e.g., the content that has been transcoded and transcrypted by the transcryptor 212 in sub-step 310-3-1.

In step 330, the trusted DRM system performs license distribution and audit. In sub-step 330-1, the client device 150 requests a license from the tDRM unit 216 for content decryption by sending the content identifier and the client identifier such as the device ID to the tDRM 216. In response to receiving the license request, in sub-step 330-2, the tDRM requests from service provider 120 an authorization for the content consumption by the client device 150. In sub-step 330-2-1, the service provider 120 checks the authorization and returns to the tDRM unit 216 a signed audit token for audit report and DRM terms for license generation. In some embodiments, in sub-step 330-2-2, upon successful authorization, the service provider 120 generates the audit token and signs the audit token before sending the service provider signed audit token to the tDRM unit 216. In sub-step 330-3, the tDRM unit 216 requests a confirmation of the audit token from the content provider 110. The content provider 110, in some embodiments, validates the audit token according to the deal exchanged in step 301, signs the audit token upon successful validation, and returns the fully signed token to the tDRM unit 216. In sub-step 330-4, the tDRM unit 216 requests from the tKSM 224 a key for content decryption. Using the tKSM key, the tDRM unit 216 generates a DRM license in sub-step 330-4-1 and returns the DRM license to the client device 150 in sub-step 330-4-2. In sub-step 330-5, the tDRM unit 216 reports to the audit unit 140 the obfuscated client identifier, the audit token that is signed by both the content provider 110 and the service provider 120, and a timestamp associated with the content consumption in accordance with some embodiments.

FIG. 4 is a block diagram illustrating an exemplary trusted environment 400 with conditional access (CA) for secure content distribution and recording of content consumption in accordance with some embodiments. In some embodiments, the trusted environment 400 includes a trusted broadcast system 410 that enforces the terms of the deal 115 between the content provider 110 and the service provider 120. In some embodiments, in the exemplary trusted environment 400, the trusted broadcast system 410 prepares the content for secure distribution and sends to the prepared content to a multiplexer 420 for streaming to the client device 150. Further, in the exemplary trusted environment 400, the trusted broadcast system 410 provides trusted reporting to the audit unit 140 in accordance with some embodiments.

In some embodiments, the trusted broadcast system 410, includes, but is not limited to, satellite broadcast, cable broadcast, digital terrestrial television (DTT), and Internet Protocol television (IPTV) system. In some embodiments, the trusted broadcast system 410 includes a transcoder and transcryptor unit 412, a trusted entitlement control message (ECM) generator (tECMG) 416, and a trusted entitlement management message (EMM) generator (tEMMG) 418. In some embodiments, the trusted broadcast system 410 also includes components in the standard digital video broadcast (DVB) simulcrypt architecture, e.g., a control word (CW) generator (CWG) (not shown), a simulcrypt synchronizer (SCS) 414, and/or an event information scheduler (EIS) (not shown), etc. The trusted broadcast system 410 is one embodiment of the trusted system 130 in FIG. 1, e.g., for securely purchasing and distributing broadcast content and recording the consumption of the live content. The transcoder and transcryptor unit 412 in the trusted broadcast system 410 along with components in the standard DVB simulcrypt architecture, e.g., the SCS 414, the tECMG 416, and the tEMMG 418 correspond to various embodiments of the trusted transcoder and transcryptor 132 in FIG. 1 for securely transcoding and transcrypting the content. And the tEMMG 418 corresponds to one embodiment of the consumption confirmation unit 134 for confirming the content consumption and reporting the consumption to the audit unit 140.

In some embodiments, similar to the trusted transcryptor 212 (FIG. 2) in the trusted DRM system 210 (FIG. 2), the trusted transcode and transcrypt unit 412 transforms the content from the content provider 110 to a form suitable for the distribution by the service provider 120, e.g., transcoding to a format that is different from the format received from the content provider 110 and re-encrypting the content for distribution in the service provider network. Different from the trusted transcryptor 212 (FIG. 2) in the trusted DRM system 210 (FIG. 2), the trusted transcode and transcrypt unit 412 in the trusted broadcast system 410 requests CW, PID, and ECM from the SCS 414, and uses the CW and ECM as key(s) to transcode and/or transcrypt the content from the content provider 110. Also different from the trusted transcryptor 212 (FIG. 2) in the trusted DRM system 210 (FIG. 2), the trusted transcode and transcrypt unit 412 in the trusted broadcast system 410 sends the transcoded and transcrypted content with the PID obtained from the SCS 414 to the multiplexer 420, and the multiplexer 420 multiplexes the content with the EMM from the tEMMG 418 to form a transport stream (TS) for delivery to the client device 150.

In some embodiments, components in the trusted broadcast system 410 enforce the reporting of content purchases to the audit unit 140, which guarantees the nonrepudiation of the content purchase reporting. To achieve accurate reporting, the trusted environment 400 securely connects the service provider business models associated with content entitlements with respective content identifiers, where the content identifiers are known to the content provider 110. In some embodiments, the trusted broadcast system 410 then securely reports the signed audit token to the audit unit 140, where the signed audit token represents the mapping(s) of the content entitlement(s) to the content identifier(s).

In particular, in some embodiments, once the content provider 110 and the service provider 120 agree on the deal 115 (e.g., agreeing on the conditions defined by the content provider 110 and the service provider 120), the content provider 110 provides the service provider 120 a content reference. The content provider 110 then provisions and stores pairs of references, which are known to the content provider 110 and the components in the trusted broadcast system 410 but not accessible by the service provider 120. Further according to the deal 505, in some embodiments, the service provider 120 creates extended business models for the content offering to end subscribers. In some embodiments, the tECMG 416 and the tEMMG 418 use the pairing information and the information from the business models offered by the service provider 120 to generate ECMs and EMMs. The pairing information thus connects the service provider business models associated with the content entitlements with the respective content identifiers and enables secure content distribution in the trusted broadcast system 410.

Figure 5A:
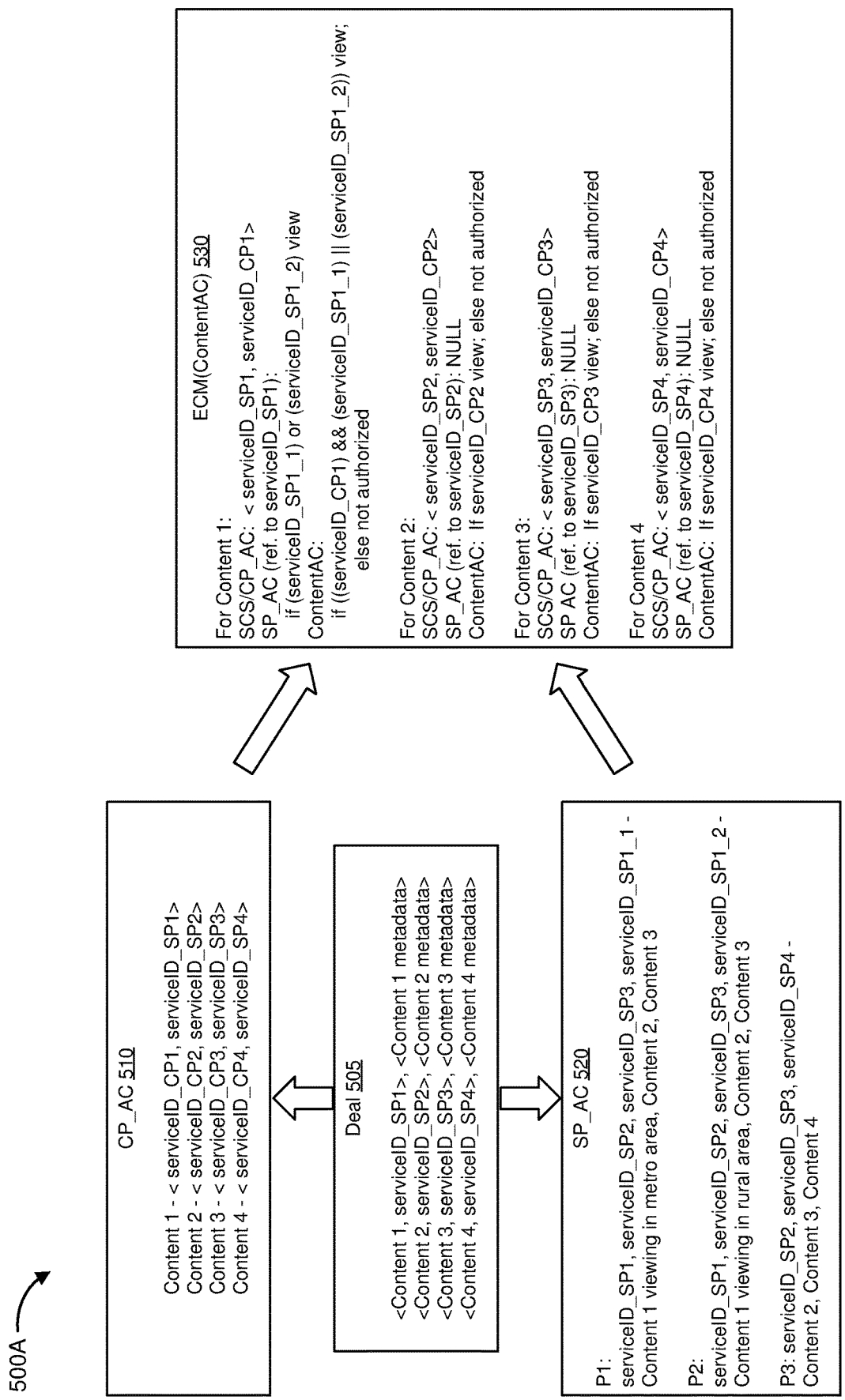
FIG. 5A is a diagram illustrating exemplary business models and entitlement control message (ECM) generation in accordance with some embodiments.

For example, FIG. 5A is a diagram 500A illustrating exemplary business models and ECM generation in accordance with some embodiments. For secure content distribution, the content provider (e.g., the content provider 110 in FIG. 4) assigns to each content an identifier, denoted as serviceID_CP. In some embodiments, the range of the content identifiers serviceID_CPs is known to the content provider and the service provider (e.g., the service provider 120, FIG. 4). Although the association between serviceID_CP and the content is known to the content provider and to the components in the trusted broadcast system, such information is not accessible by the service provider. Instead, once the content provider and the service provider agree on a deal 505 (e.g., the deal 115 in FIG. 4), the content provider provides the service provider a content reference for each content, denoted as serviceID_SP. Further, for each content, the content provider specifies the corresponding content metadata. The content provider then provisions and stores pairs of <serviceID_CP, serviceID_SP>, which are known to the content provider and the components in the trusted broadcast system but not accessible by the service provider. In some embodiments, the tEMMG 418 (FIG. 4) in the trusted broadcast system 410 (FIG. 4) uses the pairing information to generate EMMs.

In the example shown in FIG. 5A, the deal 505 specifies serviceID_SP1 as the reference to content 1 and the content metadata for content 1, serviceID_SP2 as the reference to content 2 and the content metadata for content 2, serviceID_SP3 as the reference to content 3 and the content metadata for content 3, and serviceID_SP4 as the reference to content 4 and the content metadata for content 4. According to the deal 505, the content provider creates and securely stores mappings as content provider access criteria 510 in accordance with some embodiments. The content provider access criteria 510 specify that content 1 is associated with the pair of serviceID_CP1 and serviceID_SP1, content 2 is associated with the pair of serviceID_CP2 and serviceID_SP2, content 3 is associated with the pair of serviceID_CP3 and serviceID_SP3, and content 4 is associated with the pair of serviceID_CP4 and serviceID_SP4.

Further according to the deal 505, in some embodiments, the service provider 120 uses the serviceID_SPn to create extended business models for the content offering to end subscribers, denoted as serviceID_SPn_m. In some embodiments, the service provider 120 maintains the mappings or referencing between serviceID_SPn and serviceID_SPn_m. In some embodiments, serviceID_SP or serviceID_SPn_m is used by the EPG to provide the subscriber with references to the content for purchasing. As such, once purchased by the subscriber, such references represent the business models associated with the content entitlements.

In the example shown in FIG. 5A, the service provider generates packages that define business models for the content, e.g., P1, P2, and P3, and establishes service provider access criteria 520. In the packages offered by the service provider, the first package P1 includes serviceID_SP1, serviceID_SP2, serviceID_SP3, and serviceID_SP1_1, where serviceID_SP1_1 is mapped by the service provider as referencing serviceID_SP1. The first package P1 is offered by the service provider for viewing content 1 in a metro area, content 2, and content 3. Further in the packages, the second package P2 includes serviceID_SP1, serviceID_SP2, serviceID_SP3, and serviceID_SP1_2, where serviceID_SP1_2 is mapped by the service provider as referencing serviceID_SP1. The second package P1 is offered by the service provider for viewing content 1 in a rural area, content 2, and content 3. The third package P3 includes serviceID_SP2, serviceID_SP3, and serviceID_SP4 and is offered by the service provider for viewing content 2, content 3, and content 4.

In addition to defining the business models, in some embodiments, the service provider also defines service provider access criteria (denoted as SP_AC) based on the deal 505 and provides the service provider access criteria to the trusted broadcast system 410 (FIG. 4) for CW provisioning and for ECM generation. To support CA enforcement and the content purchasing, the content access criteria (denoted as ContentAC) include at least two parts. One part relates to the content provider access criteria (denoted as CP_AC), and another part relates to the service provider access criteria (SP_AC). Access to the content requires the client device satisfying both the content provider access criteria and the service provider access criteria, e.g., ContentAC=(CP_AC) & (SP_AC). In FIG. 5A, based on both the content provider access criteria 510 and the service provider access criteria 520, content access criteria 530 (denoted as ContentAC) are generated for the content.

Referring back to FIG. 4, based on the content provider access criteria 510 (FIG. 5A) and the service provider access criteria 520 (FIG. 5A), the SCS 414 and the tECMG 416 are provisioned to generate the ECM representing the content access criteria for each content item. For example, for content 1 shown in the example in FIG. 5A, a portion of the content provider access criteria obtained by the SCS 414 specifies the pair of serviceID_CP1 and serviceID_SP1. Also for content 1, a portion of the service provider access criteria obtained by the tECMG 416 specifies that both serviceID_SP1_1 in the package P1 and serviceID_SP2_2 in the package P2 reference serviceID_SP1. Accordingly, the tECMG 416 composes the content access criteria by combining the content provider access criteria and the service provider access criteria, e.g., authorizing viewing of content 1 when serviceID_CP value is serviceID_CP1 and when serviceID_SP value is either serviceID_SP1_1 or serviceID_SP1_2. In other words, for content 1, the access criteria specify that a subscriber, who purchases either the package P1 or the package P2, would have access to and can view content 1 referenced by serviceID_SP1 according to the deal 505. The content access criteria are then used by tECMG 416 to generate ECMs.

In addition to being used by the tECMG 416, the access criteria (e.g., CP_AC, SP_AC, and/or ContentAC) are also used by the tEMMG 418 to enforce the conditional access to the content and for audit reporting. In some embodiments, when the client device 150 sends a purchase request to purchase content in a package, e.g., by sending a request with the client ID and the package ID, the service provider 120 authorizes the request. In some embodiments, authorizations are divided into two categories. The first category includes authorizations of packages that the service provider 120 receives as part of the deal 115, e.g., authorizing the purchase of a package including serviceID_SPn. Such packages are mapped to content according to the deal 115, e.g., the mapping of content 1 to serviceID_SP1 as shown in FIG. 5A. Purchases of such packages are reported to the audit unit 140 for the nonrepudiation validation, e.g., including serviceID_SPn in the audit token for confirmation by the content provider 110. The second category includes authorizations of extended packages that the service provider 120 offers to the subscribers according to its own business models. Such authorizations are not part of the deal 115 and therefore are not reported to the audit unit 140, e.g., not including serviceID_SPn_m in the audit token for confirmation by the content provider 110.

Figure 5B:
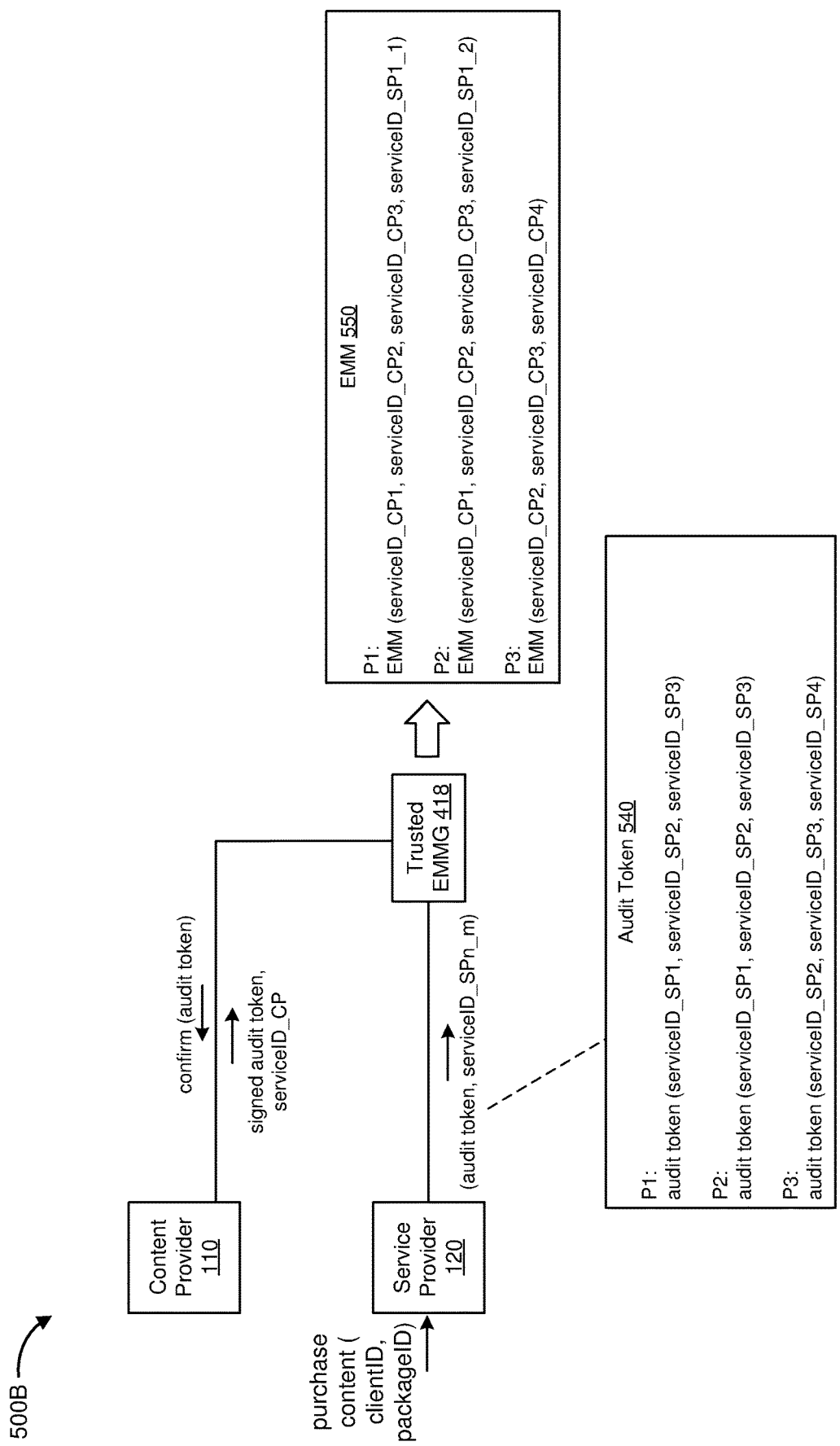
FIG. 5B is a diagram illustrating entitlement management message (EMM) and audit token generation for the exemplary business models in accordance with some embodiments.

For example, continuing the example in FIG. 5A, FIG. 5B is a diagram 500B illustrating generating EMMs 550 and audit tokens. In FIG. 5B, in response to receiving a purchase request including the client ID and the package ID, e.g., package P1, P2, and/or P3, the service provider authorizes the purchase request, and upon successful authorization, sends the audit token and the authorization of serviceID_SPn_m to the tEMMG 418. In some embodiments, upon receiving the audit token, the tEMMG 418 sends the audit token to the content provider for confirmation. In some embodiments, as shown in FIG. 5B, an audit token 540 includes identifiers such as serviceID_SP1, serviceID_SP2, and serviceID_SP3 for the packages P1 and P2 and identifies serviceID_SP2, serviceID_SP3, and serviceID_SP4 for the package P3. Such identifiers are mapped to the content according to the mappings maintained by the content provider based on the deal. As such, the content provider confirms the information in the audit token according to the mappings, signs the audit token, and sends the corresponding serviceID_CP along with the signed audit token to the tEMMG 418 for the composition of the EMMs. Also as shown in FIG. 5B, for each package being purchased, the EMMs 550 includes the corresponding serviceID_CPs received from the content provider 110 upon successful confirmation of the audit token and the serviceID_SPn_m received from the service provider 120.

Referring back to FIG. 4, using the ECMs and EMMS, the transcoder and transcryptor unit 412 performs the transcryption of the content from the content provider 110. In some embodiments, the transcoder and transcryptor unit 412 performs the role of EIS in the trusted broadcast system 410, obtains the pairing information, e.g., <serviceID_CP, serviceID_SP> from the content provider 110, and provides the pairing information to the SCS 414. The SCS 414 then provides the pairing information together with a CW to the tECMG 416 according to Simulcrypt standard. The tECMG 416 further uses serviceID_CP as CP_AC and uses serviceID_SP as a reference to SP_AC to compile a full set of access criteria and generate ECMs as described with reference to FIGS. 5A and 5B. When the client device 150 consumes the content, the CWs, ECMs, and EMMs protect the content by guarding content access based on the content access criteria, thus enabling secure content distribution and consumption.

Figure 6A:
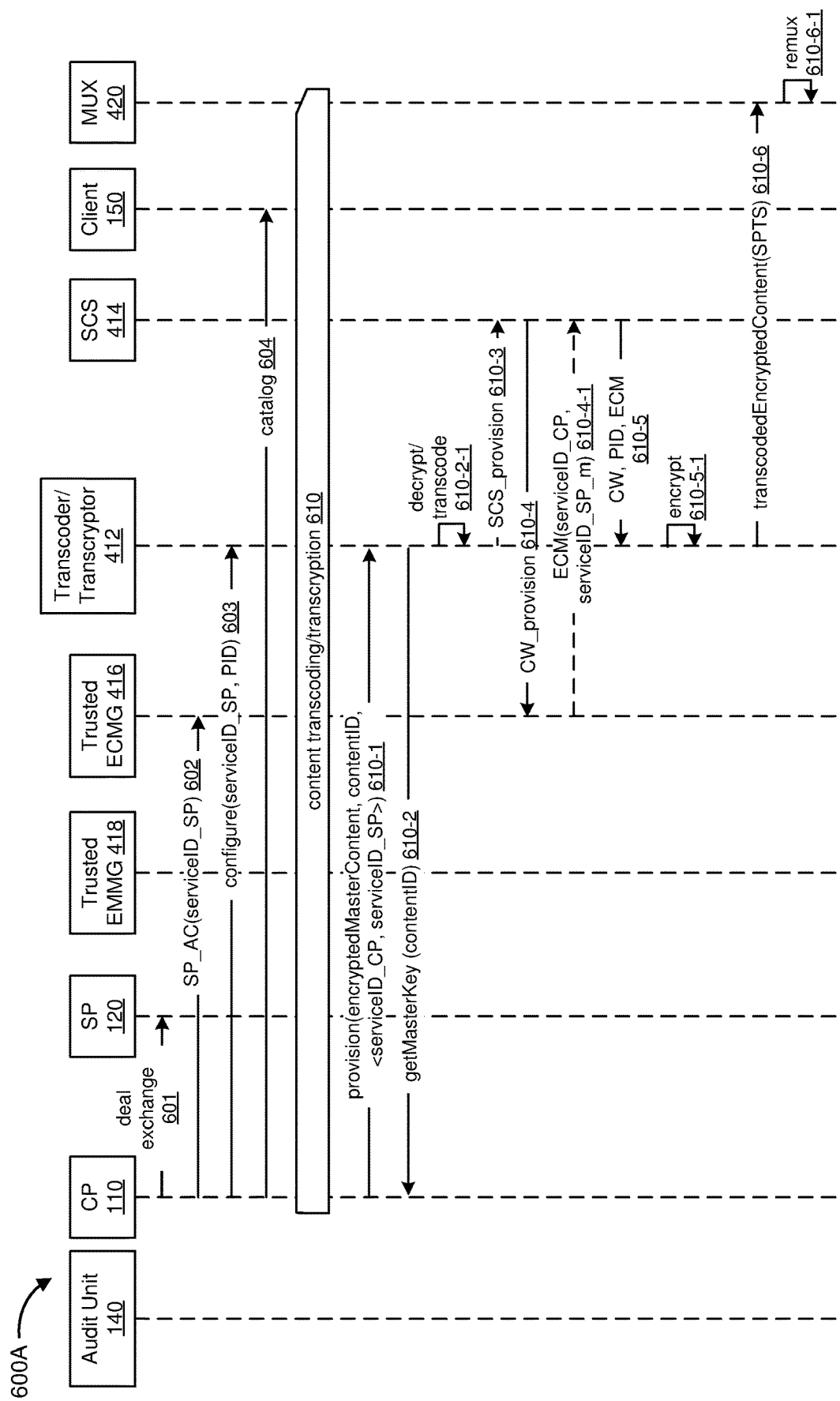
FIGS. 6A and 6B are sequence diagrams illustrating secure content distribution and audit of content consumption in the exemplary trusted CA environment in accordance with some embodiments.
Figure 6B:
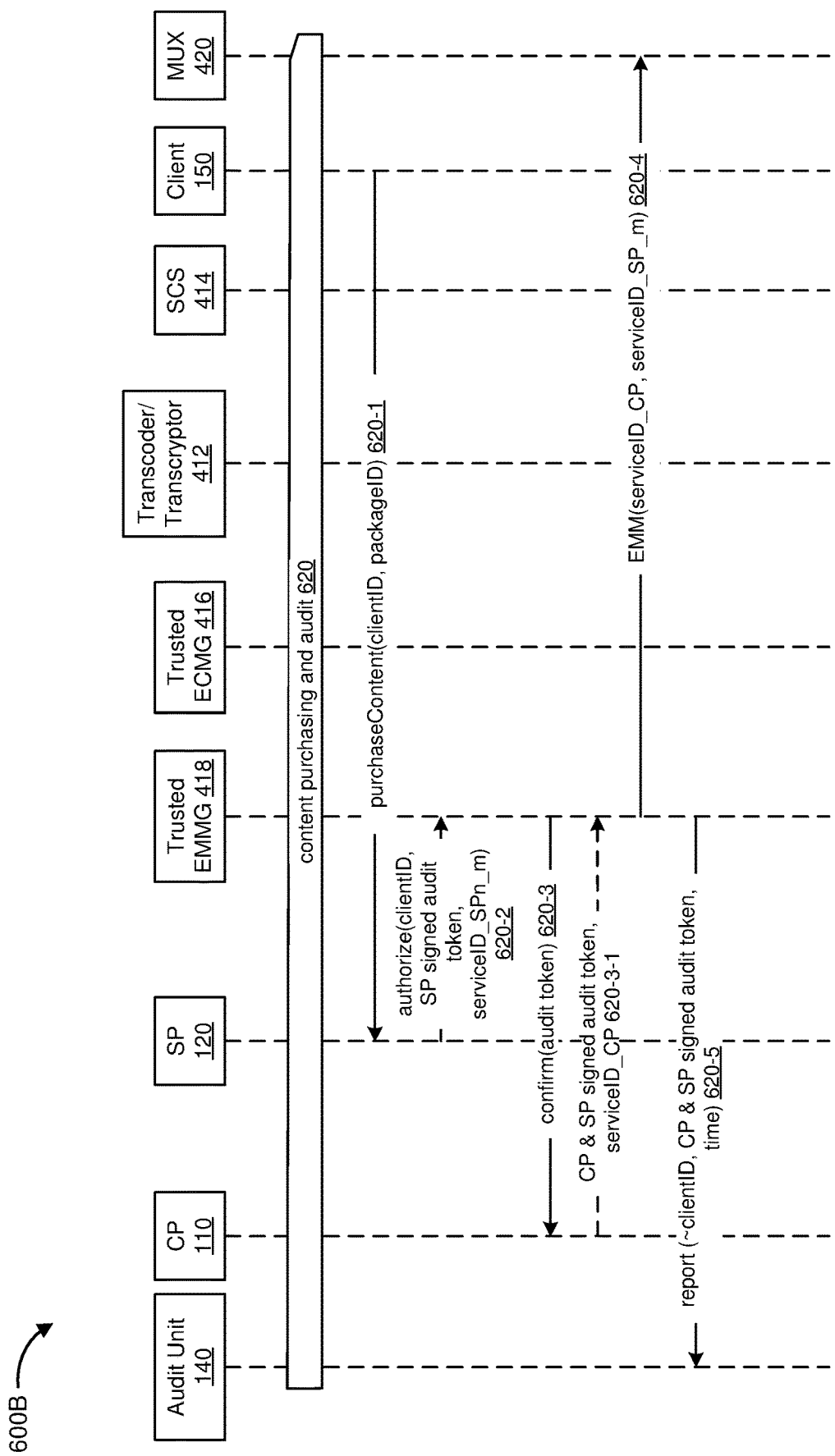

FIGS. 6A and 6B are diagrams 600A and 600B illustrating secure content distribution and audit of content consumption by the trusted broadcast system 410 (FIG. 4) in accordance with some embodiments. In FIG. 6A, in some embodiments, in step 601, the content provider 110 and the service provider 120 agree on the deal, e.g., content distribution rules such as the deal 505 in FIG. 5A. According to the deal, for each content (or content type) provided by the content provider 110 to the service provider 120, the content provider 110 encodes the content with the highest resolution and encrypts the content with the content ID. In some embodiments, the content is also watermarked. Also according to the deal, in some embodiments, the content provider 110 assigns an identifier of the content, e.g., serviceID_CP and a reference for the content, e.g., serviceID_SP. The serviceID_SP defines the business model for the content such as the number of sales, etc., and the serviceID_SP is provided to the service provider 120 by the content provider 110 in accordance with some embodiments. In some embodiments, the content provider 110 stores a pair of serviceID_SP and serviceID_CP, e.g., <serviceID_SP, serviceID_CP>, and shares the pairing information with the components in the trusted broadcast system 410 (FIG. 1), e.g., as shown in content provider access criteria 510 in FIG. 5A.

Additionally, according to the deal, the service provider 120 defines business models for content offering (e.g., a list of packages) to the subscribers. In step 602, the service provider 120 defines the service provider access criteria for each business model, e.g., define SP_AC 520 for each service_SP as shown in FIG. 5A. Further, in some embodiments, the service provider 120 provides the tECMG 416 with the list of SP_ACs indexed by serviceID_SP, e.g., providing SP_AC(serviceID_SP) to the tECMG 416. In step 603, the service provider 120 configures the transcoder and transcryptor unit 412 for content distribution, e.g., issues a configure(serviceID_SP, PID) command. In step 604, the service provider 120 provides the client device 150 with a catalog that includes the content metadata for content browsing. In some embodiments, the content metadata also include a list of packages offered by the service provider 120 for purchasing.

In step 610, the content is transcoded and/or transcrypted. In sub-step 610-1, the content provider 110 provisions the transcoder and transcryptor unit 412 with encrypted content, the content ID, and a pair of serviceID_CP and serviceID_SP, e.g., <serviceID_CP, serviceID_SP>. The pairing information is used for content entitlement control in some embodiments, e.g., for generating the ECM. In sub-step 610-2, the transcoder and transcryptor unit 412 requests the master key for content decryption from the content provider 110. Upon receiving the master key, in sub-step 610-2-1, the transcoder and transcryptor unit 412 decrypts and/or transcodes the content in accordance with some embodiments. Further, in some embodiments, in sub-step 610-3, the transcoder and transcryptor unit 412 provides the SCS 414 with a message for provisioning, e.g., via Simulcrypt EIS to SCS API. In some embodiments, the provisioning message includes the pair of serviceID_CP and serviceID_SP. In sub-step 610-4, the SCS 414 generates CW and provides the tECMG 416 with a CW provisioning message, e.g., via Simulcrypt SCS to ECMG application programming interface (API). In sub-step 610-4-1, the tECMG 416 generates the ECM that includes serviceID_CP and optionally the service provider access criteria serviceID_SPn_m that the tECMG 416 obtained from the service provider 120 in step 602. In sub-step 610-4-1, the tECMG 416 returns the ECM to the SCS 414. Further, in sub-step 610-5, the SCS 414 provides the transcoder and transcryptor unit 412 with CW, packet identifier (PID), and ECM for content encryption and stream preparation by the transcoder and transcryptor unit 412 in sub-step 610-5-1. In sub-step 610-6, the transcoder and transcryptor unit 412 provides the encrypted content to the multiplexer 420 in a single program transport stream format. In sub-step 610-6-1, the multiplexer 420 re-multiplexes the single program transport stream with the EMM into a multiple program transport stream for transmission to the client device 150 in accordance with some embodiments.

Continuing the sequence, in step 620 of FIG. 6B, the subscriber purchases the content, and the trusted broadcast system records the purchase for audit. In sub-step 620-1, the client device 150 sends to the service provider 120 a purchase request that indicates the client identifier and the package identifier associated with the package. In response, in sub-step 620-2, the service provider 120 authorizes the purchase request and provides the tEMMG 418 with the authorization data encapsulated in the signed audit token along with a list of the service provider 120 authorized services represented by serviceID_SPn_m. In some embodiments, in sub-step 620-3, the tEMMG 418 confirms the audit token the content provider 110. Once the transaction is verified by the content provider 110, e.g., by checking the transaction with the terms in the deal, the content provider 110 returns to the tEMMG 418 the signed audit token with signatures from both the content provider 110 and the service provider 120 in sub-step 620-3-1. In addition to sending the signed audit token, the content provider 110 also sends the serviceID_CP associated with the authorized services based on the mappings between serviceID_CP and serviceID_SP, e.g., <serviceID_CP, serviceID_SP> maintained by the content provider 110. In sub-step 620-4, the tEMMG 418 sends the EMM to the multiplexer 420 for generating the multiple program transport stream for transmission to the client device 150. In addition, in sub-step 620-5, the tEMMG 418 reports to the audit unit 140 with the obfuscated client ID, the audit token signed by both the content provider 110 and the service provider, and the timestamp associated with the purchase.

Figure 7A:
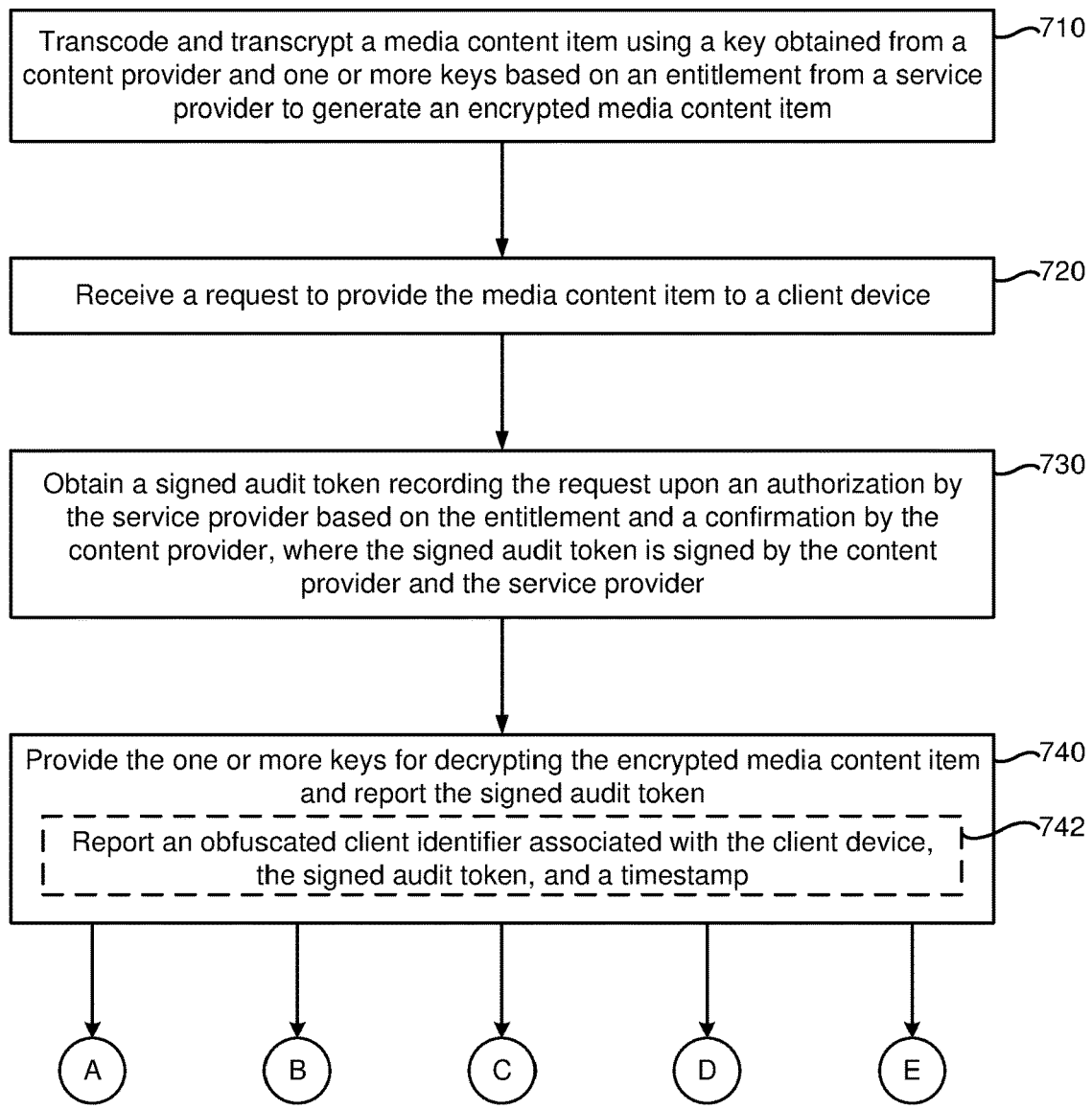
Figure 7C:
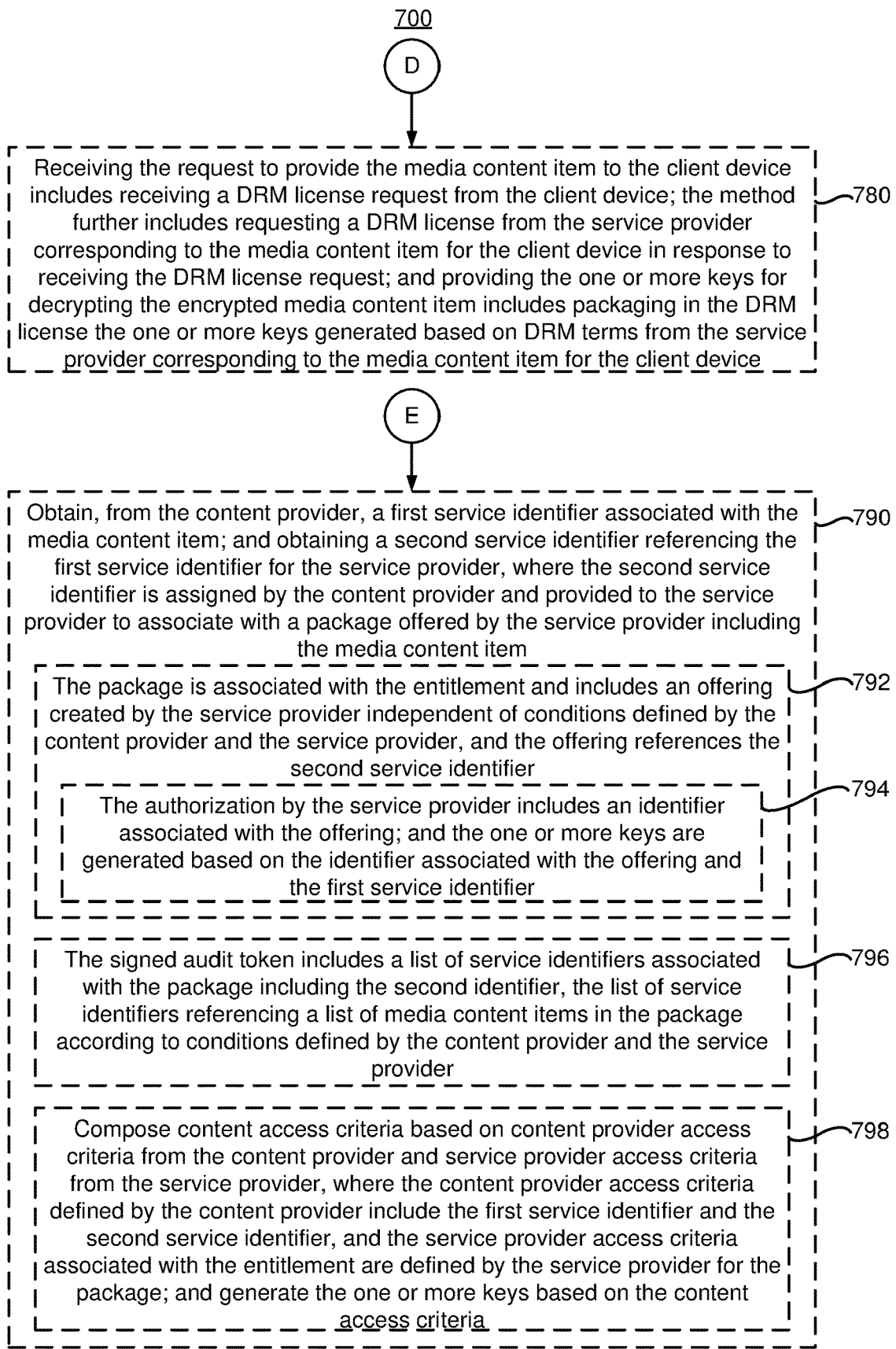

FIGS. 7A-7C are flowcharts illustrating a method 700 for secure content distribution and recording content consumption, in accordance with some embodiments. In some embodiments, the method 700 is performed at a server that includes one or more processors and a non-transitory memory, e.g., a server hosting the trusted system 130 (FIG. 1), the trusted DRM system 210 (FIG. 2), or the trusted broadcast system 410 (FIG. 4). Briefly, the method 700 includes transcoding and transcrypting a media content item using a key obtained from a content provider and one or more keys based on an entitlement from a service provider to generate an encrypted media content item; receiving a request to provide the media content item to a client device; obtaining a signed audit token recording the request upon an authorization by the service provider based on the entitlement and a confirmation by the content provider, wherein the signed audit token is signed by the content provider and the service provider; and providing the one or more keys for decrypting the encrypted media content item and reporting the signed audit token.

To that end, in FIG. 7A, as represented by block 710, the method 700 includes transcoding and transcrypting a media content item using a key obtained from a content provider and one or more keys based on an entitlement from a service provider to generate an encrypted media content item.

As represented by block 720, the method 700 includes receiving a request to provide the media content item to a client device. As represented by block 730, the method 700 includes obtaining a signed audit token recording the request upon an authorization by the service provider based on the entitlement and a confirmation by the content provider, where the signed audit token is signed by the content provider and the service provider. As represented by block 740, the method 700 includes providing the one or more keys for decrypting the encrypted media content item and reporting the signed audit token.

In some embodiments, as represented by block 742, reporting the signed audit token includes reporting an obfuscated client identifier associated with the client device, the signed audit token, and a timestamp. For example, in FIG. 2 and in sub-step 330-5 of FIG. 3, the trust KSM 224 reports to the audit unit 140 the obfuscated client identifier for privacy consideration along with the signed audit token and the time of the content consumption.

Turning to FIG. 7B, as represented by block 750, in some embodiments, obtaining the signed audit token includes obtaining an audit token from the service provider, where the audit token is generated and signed by the service provider upon the authorization by the service provider based on the entitlement, and requesting, from the content provider, the confirmation of the audit token based on conditions defined by the content provider and the service provider, and receiving from the content provider the signed audit token. Further in such embodiments, as represented by block 752, the method 700 further includes receiving from the content provider an indication of not granting the confirmation based on the conditions, and forgoing providing the one or more keys for decrypting the encrypted media content item and forgoing reporting the signed audit token in accordance with some embodiments.

For example, in FIG. 2 and in sub-step 330-2-1 in FIG. 3, the service provider 120 checks the authorization and returns to the tDRM 216 the audit token signed by the service provider in sub-step 330-2-2. The tDRM 216 then sends the partially signed audit token to the content provider 110 for confirmation in sub-step 330-3. Once the content provider 110 confirms the audit token and signs the audit token, the content provider 110 sends the audit token signed by both the content provider 110 and the service provider 120 to the tDRM 216. In another example, in FIG. 4 and in sub-step 620-2 of FIG. 6B, the service provider 120 notifies the tEMMG 418 the authorization of the purchase of a package, generates and signs the audit token and sends to the tEMMG 418. The tEMMG 418 then sends the partially signed audit token to the content provider 110 for confirmation in sub-step 620-3. Once the content provider 110 confirms the audit token and signs the audit token, the content provider 110 sends the audit token signed by both the content provider 110 and the service provider 120 to the tEMMG 418. The signed audit token indicates that the content provider 110 has confirmed the audit token according to the conditions in the deal 115. Subsequently, the tDRM 216 in FIGS. 2 and 3 or the tEMMG 418 in FIGS. 4 and 6B prepares key(s) for the client device 150, e.g., the DRM license in the case of the trusted system being the trusted DRM system 210 (FIG. 2) or the EMM in the trusted broadcast system 410 (FIG. 4). On the other hand, in the case of the content provider 110 not confirming the audit token according to the conditions in the deal 115, e.g., sending an indication of not granting the confirmation, the trusted system (e.g., the tDRM 216 in FIGS. 2 and 3 or the tEMMG 418 in FIGS. 4 and 6B) would forgo providing the key(s) to the client device 150 for decryption.

Still referring to FIG. 7B, in some embodiments, as represented by block 760, the method 700 further includes obtaining the media content item from the content provider, where the media content item is encrypted by the content provider; and receiving, from the content provider, the key associated with the media content item for decrypting the media content item. In such embodiments, as represented by block 762, transcoding and transcrypting the media content item using the key obtained from the content provider and the one or more keys from the service provider to generate the encrypted media content item includes obtaining the one or more keys associated with the entitlement of the media content item for the client device; decrypting the media content item using the key; and re-encrypting the media content item using the one or more keys to generate the encrypted media content item.

For example, in FIG. 1, the content provider 110 provides the encrypted master content and the master key, e.g., the master content has the highest quality defined according to the deal 115 and is encrypted with the master key. The trusted transcoder and transcryptor unit 132 in FIG. 1 then decrypts the master content using the master key and re-encrypts the media content item using the keys from the service provider 120. Similarly, in FIG. 2, the trusted transcryptor 212 re-encrypts the media content item using the SP key from the tKSM 214, and in FIG. 4, the transcoder and transcryptor unit 412 re-encrypts the media content item using CW and ECM from the tECMG 416, where ECM is generated by the tECMG 416 based on the service provider access criteria from the service provider 120.

In some embodiments, as represented by block 770, the media content item obtained from the content provider is encoded according to a first quality based on conditions defined by the content provider and the service provider, and the method further includes transcoding the media content item from the first quality to at least one second quality for distribution by the service provider according to the conditions. For example, when transcoding the master content, the trusted transcryptor 212 in FIG. 2 or the transcoder and transcryptor unit 412 in FIG. 4 transcodes the master content from the highest quality to one or more qualities (e.g., standard definition and/or high definition, etc.) for distribution by the service provider 120.

Turning to FIG. 7C, as represented by block 780, in some embodiments, receiving the request to provide the media content item to the client device includes receiving a DRM license request from the client device, e.g., the tDRM 216 receiving a license request from the client device 150 in sub-step 330-1 of FIG. 3. In such embodiments, the method 700 further includes requesting a DRM license from the service provider corresponding to the media content item for the client device in response to receiving the DRM license request, e.g., the tDRM 216 requesting the DRM license from the service provider 120 in sub-step 330-2 in FIG. 3, where providing the one or more keys for decrypting the encrypted media content item includes packaging in the DRM license the one or more keys generated based on DRM terms from the service provider corresponding to the media content item for the client device, e.g., the tDRM 216 receiving the DRM terms in sub-step 330-2-2 and generating the DRM license in sub-step 330-4-1 in FIG. 3.

In some embodiments, as represented by block 790, in some embodiments, the method 700 further includes obtaining, from the content provider, a first service identifier associated with the media content item and obtaining a second service identifier referencing the first service identifier for the service provider, where the second service identifier is assigned by the content provider and provided to the service provider to associate with a package offered by the service provider including the media content item. For example, in FIG. 5A, the content provider assigns serviceID_CP1, serviceID_CP2, serviceID_CP3, and serviceID_CP4 to content 1, content 2, content 3, and content 4 respectively. For each of content 1, content 2, content 3, and content 4, the content provider provides references to the content to the service provider, e.g., serviceID_SP1, serviceID_SP2, serviceID_SP3, and serviceID_SP4. The mappings captured by the content provider access criteria 510 in FIG. 5A are maintained by the content provider and shared with the trusted system upon request. Using serviceID_SP1, serviceID_SP2, serviceID_SP3, and serviceID_SP4, the service provider defines packages, e.g., P1, P2, and P3, and offers the packages to subscribers for purchase.

In some embodiments, as represented by block 792, the package is associated with the entitlement and includes an offering created by the service provider independent of conditions defined by the content provider and the service provider, and the offering references the second service identifier. In such embodiments, as represented by block 794, the authorization by the service provider includes an identifier associated with the offering, and the one or more keys are generated based on the identifier associated with the offering and the first service identifier in accordance with some embodiments. As such, the content provider 110 and the trusted system 410 in FIG. 4 do not limit the management the offerings by the service provider 120 to its subscribers. As shown in FIG. 5A, the service provider uses serviceID_SP1 to extend its content offering to end subscribers, such as extending content 1 offering associated with <serviceID_CP1, serviceID_SP1> with two business conditions that are not related to the deal 505 with the content provider. Further, the service provider associates serviceID_SP1 with serviceID_SP1_1 and serviceID_SP1_2 as represented by the service provider access criteria 520 and/or the content access criteria 530. Additionally, the service provider includes the authorizations in the relevant package offers, e.g., including serviceID_SPn_m along with the authorization in sub-step 620-2 of FIG. 6. The tEMMG 418 then generates EMM including the offering reference identifier serviceID_SP1_1, e.g., EMM for the package P1 includes (serviceID_CP1, serviceID_CP2, serviceID_CP3, serviceID_SP1_1) as shown in FIG. 5B.

In some embodiments, as represented by block 796, the signed audit token includes a list of service identifiers associated with the package including the second identifier, the list of service identifiers referencing a list of media content items in the package according to conditions defined by the content provider and the service provider. For example, in FIG. 5B, the audit token for the package P1 includes (serviceID_SP1, serviceID_SP2, serviceID_SP3), where in FIG. 5A, the service identifiers serviceID_SP1, serviceID_SP2, serviceID_SP3 are associated with the package P1 according to the deal 505, where the deal 505 includes conditions defined by the content provider and the service provider, e.g., content 1 can be offered by the service provider to subscribers with a reference identifier serviceID_SP1 and content 1 metadata according to certain pricing and/or payment terms, etc.

In some embodiments, as represented by block 798, the method 700 further includes composing content access criteria based on content provider access criteria from the content provider and service provider access criteria from the service provider, where the content provider access criteria defined by the content provider include the first service identifier and the second service identifier, and the service provider access criteria associated with the entitlement are defined by the service provider for the package; and generating the one or more keys based on the content access criteria. For example, in FIG. 5A, the content access criteria 530 are composed by combining the content provider access criteria 510 and the service provider access criteria 520. Further as shown in FIG. 4, the ECM is generated based on the content access criteria, and the ECM is used by the transcoder and transcryptor unit 412 to facilitate the encryption of the content in sub-steps 610-5 and 610-5-1 of FIG. 6A. In some embodiments, the ECM is part of the content metadata and is used for content decryption in the client 150.

Figure 8:
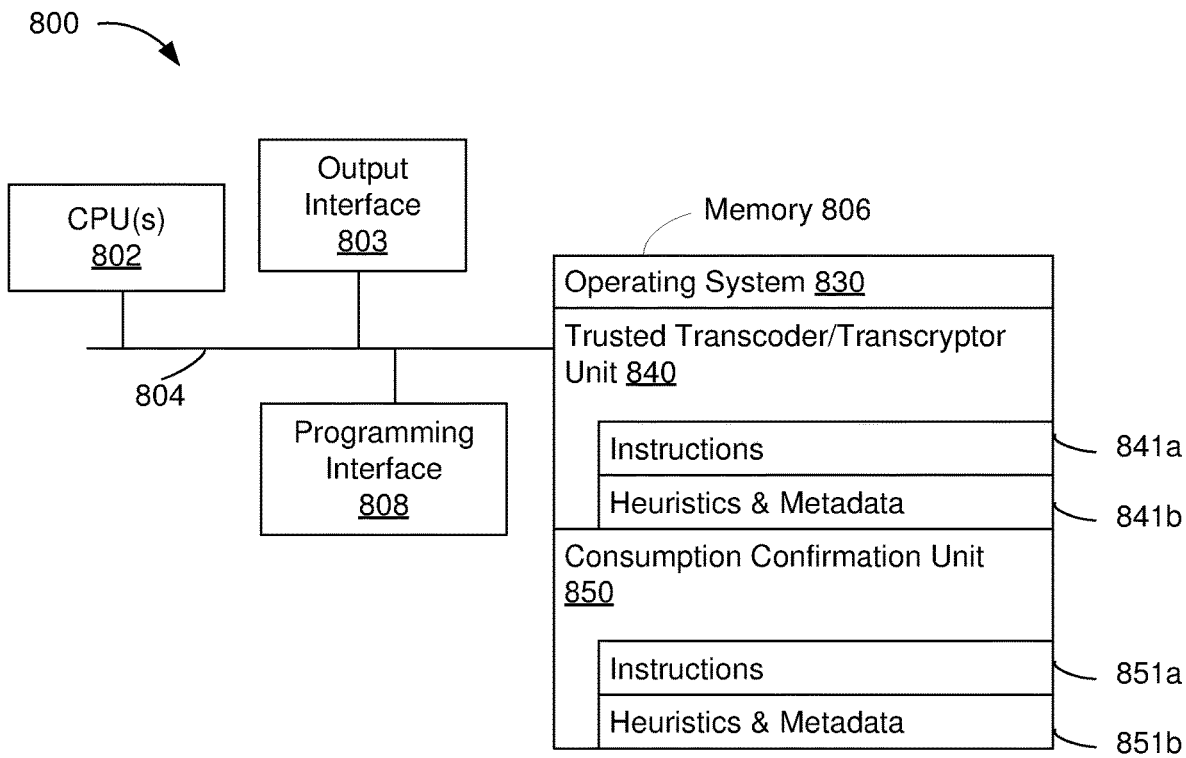
FIG. 8 is a block diagram of a computing device for secure content distribution and trusted recording of content consumption in accordance with some embodiments.

FIG. 8 is a block diagram of a computing device 800 for secure content distribution and trusted recording of content consumption in accordance with some embodiments. In some embodiments, the computing device 800 corresponds to one or more servers with one or more processors and a non-transitory memory hosting the trusted system 130 in FIG. 1 and performs one or more of the functionalities described above with respect to the trusted system 130 in FIG. 1. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPU's) 802 (e.g., processors and/or controllers), one or more output interfaces 803 (e.g., a network interface), a memory 806, a programming interface 808, and one or more communication buses 804 for interconnecting these and various other components.

In some embodiments, the communication buses 804 include circuitry that interconnects and controls communications between system components. The memory 806 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some embodiments, the memory 806 or the non-transitory computer readable storage medium of the memory 806 stores the following programs, modules and data structures, or a subset thereof including an optional operating system 830, a trusted transcoder and transcryptor unit 840, and a consumption confirmation unit 850. In some embodiments, one or more instructions are included in a combination of logic and non-transitory memory. The operating system 830 includes procedures for handling various basic system services and for performing hardware dependent tasks.

In some embodiments, the trusted transcoder and transcryptor unit 840 (e.g., the trusted transcoder and transcryptor unit 132, FIG. 1) is configured to encode, decode, encrypt, decrypt, re-encode, and/or re-encrypt content using key(s) from the content provider and the service provider. To that end, the trusted transcoder and transcryptor unit 840 includes a set of instructions 841a and heuristics and metadata 841b.

In some embodiments, the consumption confirmation unit 850 (e.g., the consumption confirmation unit 134, FIG. 1) is configured to obtain signed audit token and report the signed audit token to an audit unit, where the signed audit token is generated by the service provider and confirmed by the content provider. To that end, the consumption confirmation unit 850 includes a set of instructions 851a and heuristics and metadata 851b.

Although the trusted transcoder and transcryptor unit 840 and the consumption confirmation unit 850 are illustrated as residing on a single computing device 800, it should be understood that in other embodiments, any combination of the trusted transcoder and transcryptor unit 840 and the consumption confirmation unit 850 can reside in separate computing devices in various embodiments. For example, in some embodiments each of the trusted transcoder and transcryptor unit 840 and the consumption confirmation unit 850 reside on a separate computing device.

Moreover, FIG. 8 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
   at a server including one or more processors and a non-transitory memory:
   transcoding and transcrypting a media content item provided by a content provider using a key obtained from the content provider and one or more keys based on an entitlement from a service provider to generate an encrypted media content item, wherein the content provider is distinct from the service provider and the service provider packages the media content item to distribute to clients;
   receiving a request to provide the media content item to a client device;
   obtaining a signed audit token recording the request upon an authorization by the service provider based on the entitlement and a confirmation by the content provider, wherein the signed audit token is signed by the content provider and the service provider; and providing the one or more keys for decrypting the encrypted media content item and reporting the signed audit token.

2. The method of claim 1, wherein reporting the signed audit token includes:
reporting an obfuscated client identifier associated with the client device, the signed audit token, and a timestamp.

3. The method of claim 1, wherein obtaining the signed audit token includes:
obtaining an audit token from the service provider, wherein the audit token is generated and signed by the service provider upon the authorization by the service provider based on the entitlement;
requesting, from the content provider, the confirmation of the audit token based on conditions defined by the content provider and the service provider; and
receiving from the content provider the audit token signed by the content provider.

4. The method of claim 3, further comprising:
receiving from the content provider an indication of not granting the confirmation based on the conditions; and
forgoing providing the one or more keys for decrypting the encrypted media content item and forgoing reporting the signed audit token.

5. The method of claim 1, further comprising:
obtaining the media content item from the content provider, wherein the media content item is encrypted by the content provider; and
receiving, from the content provider, the key associated with the media content item for decrypting the media content item.

6. The method of claim 5, wherein transcoding and transcrypting the media content item using the key obtained from the content provider and the one or more keys from the service provider to generate the encrypted media content item includes:
obtaining the one or more keys associated with the entitlement of the media content item for the client device;
decrypting the media content item using the key; and
re-encrypting the media content item using the one or more keys to generate the encrypted media content item.

7. The method of claim 1, wherein the media content item obtained from the content provider is encoded according to a first quality based on conditions defined by the content provider and the service provider, and the method further includes:
transcoding the media content item from the first quality to at least one second quality for distribution by the service provider according to the conditions.

8. The method of claim 1, wherein:
receiving the request to provide the media content item to the client device includes receiving a DRM license request from the client device;
the method further includes requesting a DRM license from the service provider corresponding to the media content item for the client device in response to receiving the DRM license request; and
providing the one or more keys for decrypting the encrypted media content item includes packaging in the DRM license the one or more keys generated based on DRM terms from the service provider corresponding to the media content item for the client device.

9. The method of claim 1, further comprising:
obtaining, from the content provider, a first service identifier associated with the media content item; and
obtaining a second service identifier referencing the first service identifier for the service provider, wherein the second service identifier is assigned by the content provider and provided to the service provider to associate with a package offered by the service provider including the media content item.

10. The method of claim 9, wherein the package is associated with the entitlement and includes an offering created by the service provider independent of conditions defined by the content provider and the service provider, and the offering references the second service identifier.

11. The method of claim 10, wherein:
the authorization by the service provider includes an identifier associated with the offering; and
the one or more keys are generated based on the identifier associated with the offering and the first service identifier.

12. The method of claim 9, wherein the signed audit token includes a list of service identifiers associated with the package including the second identifier, the list of service identifiers referencing a list of media content items in the package according to conditions defined by the content provider and the service provider.

13. The method of claim 9, further comprising:
composing content access criteria based on content provider access criteria from the content provider and service provider access criteria from the service provider, wherein the content provider access criteria defined by the content provider include the first service identifier and the second service identifier, and the service provider access criteria associated with the entitlement are defined by the service provider for the package; and
generating the one or more keys based on the content access criteria.

14. A system comprising:
a trusted transcoder and transcryptor unit configured to transcode and transcrypt a media content item provided by a content provider using a key obtained from the content provider and one or more keys based on an entitlement from a service provider to generate an encrypted media content item, wherein the content provider is distinct from the service provider and the service provider packages the media content item to distribute to clients;
a consumption confirmation unit configured to:
receive a request to provide the media content item to a client device;
obtain a signed audit token recording the request upon an authorization by the service provider based on the entitlement and a confirmation by the content provider, wherein the signed audit token is signed by the content provider and the service provider; and
provide the one or more keys for decrypting the encrypted media content item and report the signed audit token.

15. The system of claim 14, wherein reporting the signed audit token includes:
reporting an obfuscated client identifier associated with the client device, the signed audit token, and a timestamp.

16. The system of claim 14, wherein obtaining the signed audit token includes:
obtaining an audit token from the service provider, wherein the audit token is generated and signed by the service provider upon the authorization by the service provider based on the entitlement; and requesting, from the content provider, the confirmation of the audit token based on conditions defined by the content provider and the service provider; and receiving from the content provider the audit token signed by the content provider.

17. The system of claim 16, wherein the consumption confirmation unit is further configured to:

receive from the content provider an indication of not granting the confirmation based on the conditions; and forgo providing the one or more keys for decrypting the encrypted media content item and forgo reporting the signed audit token.

18. The system of claim 14, wherein the trusted transcoder and transcryptor unit is further configured to:

obtain the media content item from the content provider, wherein the media content item is encrypted by the content provider; and receive, from the content provider, the key associated with the media content item for decrypting the media content item.

19. The system of claim 18, wherein transcoding and transcrypting the media content item using the key obtained from the content provider and the one or more keys from the service provider to generate the encrypted media content item includes:

obtaining the one or more keys associated with the entitlement of the media content item for the client device;

decrypting the media content item using the key; and re-encrypting the media content item using the one or more keys to generate the encrypted media content item.

20. The system of claim 14, wherein the media content item obtained from the content provider is encoded according to a first quality based on conditions defined by the content provider and the service provider, and the trusted transcoder and transcryptor is further configured to:

transcode the media content item from the first quality to at least one second quality for distribution by the service provider according to the conditions.

* * * * *